United States Patent [19]

Miyazawa et al.

[11] Patent Number: 5,512,365
[45] Date of Patent: Apr. 30, 1996

[54] LAMINATED SHEET METAL FOR CONTAINER MANUFACTURE AND PRIMER USED IN CONJUNCTION WITH SAME

[75] Inventors: Tetsuo Miyazawa; Kazuhiro Sato; Katsuhiro Imazu; Seishichi Kobayashi, all of Kanagawa; Toshio Sue, Tokyo, all of Japan

[73] Assignee: Toyo Seikan Kaisha, Ltd., Tokyo, Japan

[21] Appl. No.: 304,940

[22] Filed: Sep. 13, 1994

[51] Int. Cl.$^6$ ............... B05D 1/36; B21D 22/22; B21D 51/26

[52] U.S. Cl. ........ 428/332; 428/333; 428/474.7; 428/475.5; 428/416; 428/35.9; 220/270

[58] Field of Search ................. 428/416, 332, 428/333, 483, 474.7, 475.5, 35.9

[56] References Cited

U.S. PATENT DOCUMENTS 4,686,027  8/1987  Bonilla et al. ............. 208/39
5,070,174  12/1991  Ohba ............. 528/104

FOREIGN PATENT DOCUMENTS 2219543  12/1989  United Kingdom.

Primary Examiner—P. C. Sluby
Attorney, Agent, or Firm—The Morrison Law Firm

[57] ABSTRACT

A laminated sheet metal for the manufacture of containers is made from a sheet metal and, a layered thermoplastic resin film wherein the primer resin includes from about 50 to about 98 weight percent of polyamidodicarboxylic acid-modified epoxy resin, from about 2 to about 50 weight percent of curing agent resin, and from about 0.05 to about 10 weight percent of curing catalyst; also disclosed is a primer resin composition for use in the manufacture of laminated sheet metal for use in the manufacture of containers, made from about 50 to about 98 weight percent of polyamidodicarboxylic acid-modified epoxy resin, from about 2 to about 50 weight percent of curing agent resin, and from about 0.05 to about 10 weight percent of curing catalyst.

25 Claims, No Drawings

LAMINATED SHEET METAL FOR CONTAINER MANUFACTURE AND PRIMER USED IN CONJUNCTION WITH SAME

BACKGROUND OF THE INVENTION

The present invention relates to a laminated sheet metal used for container manufacture and a primer used in conjunction with same. More particularly, the present invention relates to a laminated sheet metal and a novel primer used to bind a thermoplastic resin film to the sheet metal resulting in enhanced processability and corrosion resistance.

Conventional methods used to produce cans result in two general types. A three piece can is known having a can body with a seam on the side. The seam is formed by soldering, adhesion, welding or similar processes. A top cover and a bottom cover are crimped on to the top and the bottom of the can body, respectively.

A conventional two-piece can has a seamless can body. The seamless can body is formed by drawing, deep-drawing with bending, drawing and ironing, impact forming (or stamping), and by similar methods. A container having a flange with a heat-sealed cover is also known. This known can is used as a light-weight container. A drawing process is used to form this conventional two piece can from coated metallic foil.

Metallic materials used for any of the cans above require protective coatings on both inside and outside surfaces. This is required to prevent corrosion and leaching of the metal. In order to reduce material costs and increase productivity, most metallic materials are now pre-coated prior to processing the metallic materials into cans.

Coated metallic materials used to make cans thus require superior endurance properties. These coated metallic materials have endurance properties that must be maintained in the face of severe processing conditions. Coated metallic materials also need superior sealing and corrosion resistance properties.

Generally, prior art methods of manufacturing cans utilize epoxy resins as coating materials. The use of epoxy resins is preferred due to their corrosion resistance and their ability to adhere to metallic materials. An epoxy resin may be used in combination with other curing resins, such as a phenol resin. The phenol resin is added to cure the epoxy resin.

Japanese Laid Open Patent Publications Nos. 59-15458, 1-284431 and 2-286709, disclose examples of prior art epoxy resins. These disclosures include a variety of epoxy resins modified by at least one of an aliphatic acid, a dibasic acid, a polyamidodicarboxylic acid and similar acids.

Conventional processes for metal sheet formation now include the step of laminating thermoplastic resin films to metallic materials with a primer, instead of coating thermosetting resins directly onto the metallic materials. Japanese Laid-open Patent Publication No. 62-10188 discloses such a process for use in the packaging industry.

Similarly, Japanese Laid Open Patent Publication No. 62-10188 discloses a process which includes the formation of a layered body. The layered body includes a polyester based film thermally adhered to a metallic foil substrate. A thermosetting primer is sandwiched between the foil substrate and the film. The polyester based film is heat-sealable. The thermosetting primer further includes an epoxy resin component. The epoxy resin component includes about 450 to about 5500 units of an epoxy equivalent. The epoxy resin component further includes a curing resin component having one or more functional groups effective to react with the epoxy resin component to form a coating.

Japanese Laid Open Patent Publication No. 62-10188, further describes a thermosetting primer having a gel fraction ranging from about 50 to about 100 percent. The thermosetting primer is extracted in chloroform at 60° C. for 60 minutes. In order to improve corrosion resistance properties of the layered body the polyester based film is disposed in a continuous, unbroken skin thereupon. The thermosetting primer formed from the epoxy-phenol resin exhibits improved adherence properties.

The layered body according to Japanese Laid-open Patent Publication No. 62-10188 endures severe processing conditions. This includes the retort sterilization step required for the canning process. However, the process according to Japanese Laid Open Patent Publication No. 62-10188 is plagued by numerous drawbacks. Chief among these are leaching of the involved metal and under-film corrosion. These difficulties occur when laminating a thermoplastic resin film on a metallic sheet containing a epoxy-phenol resin primer.

Forming cans by prior art processes (by stretching, deep-stretching, and deep-stretching with thin wall formation at side walls of the container) creates products having serious durability limitations.

Generally, products manufactured according to conventional processes, such as drawing or re-drawing yield inferior cans. A major drawback with the known processes is that cans are produced having an uneven height, and an improperly sized circumference (generally smaller than the desired dimension). It is thought that plastic flow of the sheet metal during the process is responsible for the uneven height and circumference of cans.

Further, cans manufactured according to conventional bending and stretching processes also have bodies with thinner walls than desired. Such thinner walls have low endurance properties and are easily deformed when subjected to stresses.

Finally, in a deep drawing process designed to form cans with thin walls, a conventional, epoxy-phenol resin-based primer tends to break and peel off. This is again due to the plastic flow of the sheet metal and the poor quality of adherence to resin films. Under-film corrosion and the leaching of metals are similarly caused by these drawbacks of the prior art.

Many similar problems exist during the manufacture of cans having conventionally known "easy open ends". Generally, scoring and riveting are employed during the manufacture of cans having such easy open ends. Scoring is used with dies and pre-coated can covers. Riveting is employed at the coated can cover to fasten tabs with rivets. The inside surface of the processed area tends to be damaged easily. This also results in more serious under-film corrosion and leaching problems, as discussed above.

OBJECTS AND SUMMARY OF THE INVENTION

The present invention overcomes the problems in the previous practice by disposing a layered thermoplastic resin film over a primer resin layer consisting of polyamidodicarboxylic acid-modified epoxy resin. This approach allows for a more effective and durable chemical structure, which results in containers capable withstanding even the most severe of industrial conditions.

Accordingly, it is an object of the invention to provide a laminated sheet metal consisting of a sheet metal having a primer resin layer, and a layered thermoplastic resin film for container manufacture which overcomes the drawbacks of the prior art.

It is a further object of the invention to provide a laminated sheet metal consisting of a sheet metal having a primer resin layer, and a layered thermoplastic resin film for container manufacture, wherein the primer resin layer has enhanced adherence and coating properties on the thermoplastic resin film and the metal substrate, even under severe processing conditions.

It is a still further object of the invention to provide a laminated sheet metal consisting of a sheet metal having a primer resin layer, and a layered thermoplastic resin film for can manufacture, wherein the primer resin layer has enhanced adherence and coating properties on the thermoplastic resin film under severe conditions of retort sterilization which are included in the canning process.

Briefly stated, there is provided a laminated sheet metal for the manufacture of containers which is made from a sheet metal and, by way of a primer resin layer, a layered thermoplastic resin film wherein the primer resin comprises from about 50 to about 98 weight percent of a polyamidodicarboxylic acid-modified epoxy resin, from about 2 to about 50 weight percent of curing agent resin, and from about 0.05 to about 10 weight percent of curing catalyst; also disclosed is a primer resin composition for use in the manufacture of laminated sheet metal which is for use in the manufacture of containers, the resin is made from about 50 to about 98 weight percent of polyamidodicarboxylic acid-modified epoxy resin, from about 2 to about 50 weight percent of curing agent resin, and from about 0.05 to about 10 weight percent of curing catalyst.

In accordance with these and other objects of the invention, there is provided a laminated sheet metal, comprising; a sheet metal, a thermoplastic resin film, a primer resin layer being disposed between said sheet metal and said thermoplastic resin film, the primer resin layer being composed of a primer resin composition and, the primer resin composition containing, in weight percent, from about 50 to about 98 of a polyamidodicarboxylic acid modified epoxy resin from about 2 to about 50 of a curing agent resin, and from about 0.05 to about 10 of a curing catalyst.

According to a feature of the invention, there is provided a laminated sheet metal comprising; a sheet metal, a thermoplastic resin film, a primer resin layer being disposed between said sheet metal and said thermoplastic resin film, said primer resin layer being composed of a primer resin composition, and said primer resin composition containing, in weight percent, from about 50 to about 98 of a polyamidodicarboxylic acid modified epoxy resin, from about 2 to about 50 weight percent of a curing agent resin, and from about 0.05 to about 10 weight percent of a curing catalyst, said polyamidodicarboxylic acid modified epoxy resin includes an epoxy skeleton of bisphenol A type, wherein the concentration of said polyamidodicarboxylic acid modified epoxy resin per said epoxy skeleton is from about 1 to about 10 weight percent.

According to a further feature of the invention, there is provided a primer for use in the preparation of a laminated sheet metal, comprising; from about 50 to about 98 weight percent of polyamidodicarboxylic acid modified epoxy resin, from about 2 to about 50 weight percent of curing agent resin, and from about 0.05 to about 10 weight percent of curing catalyst.

The above, and other objects, features and advantages of the present invention will become apparent from the following description read in conjunction with the accompanying tables, in which letters and sample numbers designate the involved resins.

DETAILED DESCRIPTION OF THE PREFERRED EMBODIMENT

The present invention is directed to a laminated sheet metal, consisting of a sheet metal having a sheet metal and a coating having at least two layers. The two layers include at least a primer resin layer and a thermoplastic resin film or layer useful for manufacturing containers.

The primer layer is composed of a primer composition which includes a polyamidodicarboxylic acid modified epoxy resin. This resin has a chemical structure having a high molecular weight polyamide chain. The chain is bound to an epoxy resin skeleton through an ester group.

The present inventors have discovered that the enhanced properties of the primer layer of the present invention are derived from intrinsic effects of the polyamide as a linear polymer.

Generally, adherence of epoxy resins to metallic substrates or resin films is highly problematic. This is because adherence of the epoxy resins to metallic substrates substantially deteriorates when the modified epoxy resin is a high molecular weight polymer.

However, the polyamidodicarboxylic acid modified epoxy resin of the present invention is an exception to this general rule. The adherence of the polyamidodicarboxylic acid modified epoxy resin is enhanced because of its excellent hot-melt adhesion. It is likewise noted that the modified epoxy resin provides this enhanced hot-melt adhesion both to metallic substrates and resin films.

The primer composition may be combined with a curing agent resin (hereinafter curing resin) and a curing catalyst. Combining the curing resin, however, and the curing catalyst provides a hard and brittle epoxy resin. The primer composition according to the present invention maintains superior processability and enhanced adherence under cured conditions.

The primer composition imparts superior corrosion resistance to the metallic substrate. This property results from the plasticization effect of the terminal carboxyl groups of the polyamidodicarboxylic acid modified epoxy resin.

The primer resin composition according to the present invention includes from about 50 to about 98 weight percent of polyamidodicarboxylic acid modified epoxy resin. The primer resin composition further includes from about 2 to about 50 weight percent of the curing resin, and from about 0.05 to about 10 weight percent of the curing catalyst. It is preferable that the content of the curing catalyst range from about 0.1 to about 5 weight percent of curing catalyst.

The primer layer becomes brittle when the amount of the polyamidodicarboxylic acid modified epoxy resin falls below 50 weight percent. On the other hand, when the amount of the polyamidodicarboxylic acid modified epoxy resin exceeds 98 weight percent, the boundary between the primer layer and the metallic substrate becomes weak and easily breaks during processing.

Furthermore, when the amount of the polyamidodicarboxylic acid modified epoxy resin exceeds 98 weight percent, the hardness of the resulting primer layer is too low. Under these conditions, the primer layer breaks down by aggregation and the strength of the primer layer is substantially reduced. This reduction in strength, in turn, reduces the adherence and corrosion resistance property of the primer layer.

The primer layer becomes brittle when the amount of the curing catalyst exceeds 10 weight percent. The boundary between the primer layer and the metallic substrate weakens and breaks during processing when the amount of the curing catalyst exceeds 10 weight percent.

When the amount of the curing catalyst falls below about 0.05 weight percent, the hardness of the resulting primer composition is insufficient. The primer composition tends to break down by aggregation and the overall strength of the primer composition is substantially reduced. These conditions, in turn, substantially weaken adherence and corrosion resistance of the resulting primer layer.

It is preferable that the molecular weight of the polyamidodicarboxylic acid modified epoxy resin be from about 20,000 to about 100,000 and the epoxy equivalent of the polyamidodicarboxylic acid modified epoxy resin be from about 2500 to about 8000.

When the molecular weight and the epoxy equivalent of the polyamidodicarboxylic acid modified epoxy resin exceed falls below the aforementioned ranges, the toughness of the resulting primer composition and resulting primer layer deteriorates substantially. On the other hand, when the molecular weight and the epoxy equivalent of the polyamidodicarboxylic acid modified epoxy resin exceeds the aforementioned ranges, the adherence and corrosion resistance properties of the resulting primer composition and primer layer are compromised.

It is preferable that the polyamidodicarboxylic acid modified epoxy resin have an epoxy skeleton of bisphenol A type with from about 1 to about 10 weight percent of polyamidodicarboxylic acid modifier per skeleton. When the amount of the modifier falls below about 1 weight percent per skeleton, the toughness of the resulting primer composition and primer layer deteriorates substantially. When the amount of the modifier exceeds 10 weight percent, the adherence and corrosion resistance properties of the resulting primer composition and primer layer deteriorate, and the glass transition temperature (Tg) also decreases.

The present invention is described in detail with reference to the individual components which form the laminating sheet according to the present invention. Described hereinafter, are the individual components of the laminating sheet of the present invention.

Polyamidodicarboxylic Acid Modified Epoxy Resin

The polyamidodicarboxylic acid modified epoxy resin according to the present invention has a chemical structure in which a polyamidodicarboxylic acid is bound to an epoxy resin skeleton through an ester group.

The polyamidodicarboxylic acid is a polyamide containing two terminal carboxyl groups according to the primer composition of the present invention it functions as a modifier. The polyamidodicarboxylic acid is formed by the condensation of a dibasic acid and diamine. It is important that a carboxyl group is attached to the terminal of the polyamide chain so that the high molecular weight polyamide chain can be introduced to the epoxy skeleton through an ester group.

The polyamide chain is prepared using a dibasic acid which may be one of aliphatic, alicyclic, and aromatic. Preferably, a dibasic acid having from about 4 to about 48 carbon atoms is used. Alternately, a dimeric dibasic acid having from about 4 to about 48 carbon atoms may be used. A dimeric acid may be obtained from the dimerization of a highly unsaturated aliphatic acid.

Highly unsaturated aliphatic acids include, for example, an aliphatic acid obtained from the purification of a plant oil or similar types of oil. The plant oils further include one of a drying oil (a natural oil that hardens on exposure to air, having unsaturated fatty acids which polymerize on oxidation), a semi-drying oil, and similar types of oil.

Linoleic acid, linolenic acid, and oleic acid are examples of $C_{18}$ ununsaturated aliphatic acids. The dimeric acid according to the present invention includes an oligomer (for example, a trimer of an unsaturated acid and a monomeric aliphatic acid), in addition to a dimer of an unsaturated acid.

The chemical structure of a dimeric acid varies depending upon the kind of the monomeric aliphatic acid and the method used in polymerization. The dimeric acids with the structures shown below are known and may be used in the present invention.

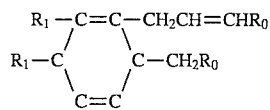

where, $R_0$ is a $-(CH_2)_7COOH$ group and $R_1$ is a $-(CH_2)_4CH_3$ group

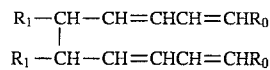

where, $R_0$ is a $-(CH_2)_7COOH$ group and $R_1$ is a $-(CH_2)_4CH_3$ group.

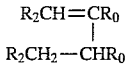

where, $R_0$ is a $-(CH_2)_7COOH$ group and $R_1$ is a $-(CH_2)_7CH_3$ group.

Referring to The above structures, it is clear that each of the dimeric acids contain at least one carbon double bond (C=C) in its chain. Before being used in the present invention, the double bond (C=C) portions may be saturated by hydrogenation in order to maintain their aromaticity.

The diamine for use in the preparation of the polyamidodicarboxylic acid includes at least one of aliphatic and aromatic diamines. Aliphatic diamines for use in the present invention are exemplified by at least one of ethylene diamine, tetramethylene diamine, hexamethylene diamine. decamethylene diamine. dodecamethylene diamine, tridecamethylene diamine, N-oleyl-1,3-propane aliamine, and related compounds.

The aromatic diamines include at least one of a p-phenyl diamine, bis(4-aminophenyl)methane, 2,2-bis(4-aminophenyl)propane, and similar compounds. It is preferred that ethylene diamine and bis(4-aminophenyl)methane be used.

The polyamidodicarboxylic acid is synthesized by polycondensation of the aforementioned dicarboxylic acid and diamine using conventional methods.

Namely, in order to form a polyamidodicarboxylic acid having two terminal carboxyl groups, an excessive amount of dicarboxylic acid is reacted with a diamine in an inert atmosphere to produce a nylon salt.

The polyamidodicarboxylic acid modified epoxy resin according to the present invention includes an epoxy resin synthesized by the condensation of an aromatic diol component, particularly a bisphenol, and an epihalohydrin. The bisphenol for use in the constitution of the epoxy resin according to the present invention may be a divalent phenol represented by the structure below:

HO—Ph—R—Ph—OH where Ph is a phenyl group, more particularly a p-phenyl group, and R is a divalent bridging group or a direct bonding.

In the divalent phenol shown above, where the divalent bridging group includes at least one of an alkylidene group represented by —CR$_1$R$_2$—, an —O— group, a —S— group, a —SO$_2$— group, and a —NR$_3$— group.

Here, the R$_1$ and R$_2$ in the alkylidene may be one of a hydrogen atom, a halogen atom, an alkyl group with 1 to 4 carbon atoms, and a perhaloalkyl group.

R$_3$ in the —NR$_3$— may be a hydrogen atom or an alkyl group with 1 to 4 carbon atoms. Generally, use of at least one of alkylidene groups and the ether groups are preferred.

A suitable divalent phenol is exemplified by 2,2'-bis(4-hydroxyphenyl)propane which is also known as bisphenol A, 2,2'-bis(4-hydroxyphenyl)butane which is also known as bisphenol B, 1,1'-bis(4-hydroxyphenyl)propane, bis(4-hydroxyphenyl)methane which is also known as bisphenol F, 4-hydroxyphenyl ether, p-(4-hydroxy)phenol and related compounds. Bisphenol A is preferred.

The polyamidodicarboxylic acid modified epoxy resin of the present invention may be formed by a direct reaction between the aforementioned polyamidodicarboxylic acid and an epoxy resin of the bisphenol type.

However, in order to effectively synthesize a polyamidodicarboxylic acid modified epoxy resin (with the aforementioned desired molecular weight and epoxy equivalent under homogeneous conditions), it is preferable to use a high molecular weight epoxy resin. The high molecular weight epoxy resin is synthesized by reacting a bisphenol with a low molecular weight liquid epoxy resin.

During synthesis of the high molecular weight epoxy resin, polyamidodicarboxylic acid is added. Thus, the modification and the conversion to high polymer by the polyamidodicarboxylic acid proceed simultaneously.

In general, the low molecular weight liquid epoxy resin for use in the aforementioned reaction has an epoxy equivalent of from about 180 to about 500, and a numerical average molecular weight of about 340 to about 1000. Various methods may be used for this reaction.

For example, the liquid epoxy resin, the bisphenol, and the polyamidodicarboxylic acid may be added simultaneously to start the reaction. Likewise, the liquid epoxy resin can be reacted with the polyamidodicarboxylic acid, followed by the reaction of the semi-solid of the resulting epoxy ester with the bisphenol. Moreover, the polyamidodicarboxylic acid can be reacted with the bisphenol to form a polyamide ester having terminal hydroxyl groups.

This is then followed by the reaction of the resulting polyamide ester with liquid epoxy resin. All of the above mentioned reactions can be carried out in a multiple stage fashion.

The aforementioned reactions can be carried out in an organic solvent including at least one of a glycol, glycol ether, glycol ester, acetate, alcohol, ketone, and various aromatics. The temperature for this reaction may range from about 100° to about 220° C. The presence of a catalyst is optional. The catalyst can be one of a hydroxide, a carbonate, a sulfonium salt, a chloride, and an amine of alkali and alkaline earth metals.

Curing (Agent) Resin

According to the present invention, a curing agent resin may be combined with the primer composition. This curing resin is a resin which includes a reactive functional group. This reactive functional group can react with one of an epoxy group and a hydroxyl group of an epoxy resin.

The curing resin can include at least one of a phenol aldehyde resin, an amino resin (such as one of a urea resin, a melamine resin, and a guanamine resin), a xylene-formaldehyde resin, an acrylic resin and related resins.

The curing resin may also be a resorcinol type phenol resin. If the curing resin is a resorcinol type phenol resin it is preferable that the concentration of one of a methylol group and an esterified methylol group be from about 50 to about 1000 millimole per 100 g of resin. It is preferred to use resorcinol type phenol resin to achieve coating material having enhanced physical properties and adhesion properties.

If the curing agent resin is an aminoaldehyde resin, it is preferable that the concentration of one of the methylol group and esterified methylol group be from about 50 to about 500 millimole per 100 g of resin.

If the curing resin is an acrylic resin, the preferred concentration of at least one of a carboxylic group, an acid anhydride group, and a hydroxyl group ranges from about 10 to about 500 millimole per 100 g of resin. A phenol aldehyde resin or amino resin is preferably used as the curing agent resin.

Curing Catalyst

The primer resin composition according to the present invention contains a curing catalyst in addition to the aforementioned components. Although both inorganic and organic acids can be used as curing catalysts with the present invention, phosphoric acid and toluene sulfonic acid are preferred.

Primer Composition

The primer resin composition is composed of at least a polyamidodicarboxylic acid modified epoxy resin, a curing resin, and a curing catalyst. The primer resin composition includes from about 50 to about 98 weight percent of polyamidodicarboxylic acid modified epoxy resin. The primer resin composition further includes from about 2 to about 50 weight percent of the curing resin, and from about 0.05 to about 10 weight percent of the curing catalyst. It is preferred that the primer resin composition according to the present invention be used with a solution having an organic solvent.

The organic solvent can include at least one of an aromatic hydrocarbon, a ketone, an alcohol, a cellosolve, an ester, a glycol and a glycol ether. Examples of an aromatic hydrocarbon include at least one of toluene, xylene and similar compounds, while ketones for use in the present invention include at least one of an acetone, methyl ethyl ketone, methyl isobutyl ketone, cyclehexanone and related compounds.

Examples of alcohol for use as an organic solvent include one of an ethanol, propanol, butanol and related hydroxyl group containing compounds, while the cellosolve is exemplified by at least one of a ethyl cellosolve, butyl cellosolve, and related glycol ethers. Examples of esters for use as organic solvents include at least one of an ethyl acetate, butyl acetate and the like.

The above noted organic solvent can be used alone or together with one or more other solvents.

The solid content of the solution containing the organic solvent preferably ranges from about 2 to about 40 weight percent, optimally from about 2 to about 30 weight percent.

A variety of additives for use in coating can be added to the solution containing the organic solvent. Such additives include plasticizer, lubricants, pigments, fillers, stabilizers, and the like. Optionally, a preliminary condensation can be performed to improve the coating properties of the solution. Preliminary condensation of the solution containing the solvent helps prevent the solution from thickening during storage.

Laminated sheet metal

The sheet metal according to the present invention includes a variety of surface treated steel sheets. The sheet metal according to the present invention also includes sheets of light metals such as aluminum.

The surface treated steel sheets may be cold stretching steel sheets having at least one surface treatment after annealing and secondary cold stretching. The surface treatment includes at least one of zinc plating, tin plating, nickel plating, electrolytic chromic acid treatment, chromic acid treatment, and related plating types.

An example of a preferred surface treated steel sheet is an electrolytic chromic acid treated steel sheet containing from about 10 to about 200 mg/m$^2$ of a metallic chromium layer and a chromium oxide layer. The chromium oxide content of this layer is from about 1 to about 50 mg/m$^2$. Such an electrolytic chromic acid treated steel sheet is superior to others in terms of both adherence with coating materials and corrosion resistance.

Another preferred surface treated steel sheet is exemplified by a hard tin plate consisting of from about 0.5 to about 11.2 mg/m$^2$ of tin, electroplated on the steel sheet. Chromic acid treatment (with or without phosphoric acid) is preferred to give the tin plate is a metallic chromium ranging from about 1 to about 30 mg/m$^2$.

Other than conventionally known "pure" aluminum sheets, aluminum alloy sheets may be used as the light metal sheets to practice the present invention. In addition to aluminum, aluminum alloy sheets preferably contain from about 0.2 to about 1.5 weight percent of Mn, from about 0.8 to about 5 weight percent of Mg, from about 0.25 to about 0.3 weight percent of Zn, and from about 0.15 to about 0.25 weight percent of Cu. Such aluminum alloy sheets exhibit superior corrosion resistance and processability.

According to the present invention, such aluminum alloy sheet are treated by chromic acid (with or without phosphoric acid) resulting in a metallic chromium content ranging, from about 20 to about 300 mg/m$^2$.

Bare metal ranging in thickness from about 0.10 to about 0.50 mm can also be used. The preferred thickness of the bare metal varies with the type of containers produced according to the present invention.

The thickness of the bare, surface treated steel sheet preferably ranges from about 0.10 to about 0.30 min. The thickness of a bare, light metal sheet preferably ranges from about 0.15 to about 0.40 mm.

According to a feature of the present invention, a thermoplastic resin film can be used in the layered laminate. This thermoplastic resin film is at least one of a polyolefin resin film, a polyester resin film, a polyamide film, a polyvinyl chloride film, a polyvinyliene chloride film and similar films.

The polyolefin resin film includes resin films of polyethylene, polypropylene, ethylene-propylene copolymer, ethylene-vinyl acetate copolymer, ethylene-acrylate copolymer, and reacted films. The polyester film is at least one of polyethylene terephthalate, polyethylene adipate, polybutylene terephthalate, ethylene-terephthalate/isophthalate copolymer, ethylene terephthalate/adipate copolymer, blended copolymer, ionomer and similar films.

Films of nylon 6; nylon 6,6; nylon 11; nylon 12; and comparable nylons can also be used for the polyamide film of the present invention. Such a film may be one of an original film, a one-directionally drawn film, or a two-directionally drawn film. Preferably, the thickness of the film ranges from about 3 to about 100/μm. A superior film ranges from about 5 to about 50/μm in thickness. Among these films, a two-directionally drawn film of polyethylene terephthalate or of a polyethylene terephthalate based polyester copolymer is preferable for practicing the present invention.

The primer resin composition is first applied with a viscosity suitable for coating. The primer resin coating material is applied to at least one of the surfaces of the aforementioned metallic material and the thermoplastic resin film. This application can be effectuated by means of roller coating, or brush coating.

Alternately, the primer resin composition may be applied by coater coating using a docter coater, an air-knife coater, a reverse coater, or similar device, and by spray coating, by static coating, and the like.

The primer resin composition may be used to form a layered laminate by means of hot melt adhesion. This can be accomplished either after drying, when the material is no longer tacky, or after curing. In the former case, where the uncured primer resin layer is used to form the laminate, the primer resin composition is simultaneously cured by heat during hot melt adhesion.

The primer resin composition can be cured at a relatively low temperature ranging from about 100° to about 250° C. in a short time. For example, at 150° C. (a relatively low temperature), heating for between 10 and 100 seconds is sufficient to completely cure the primer resin composition. A 200° C. (a relatively high temperature), the curing is completed by heating for an even shorter time period—between 1 and 15 seconds. The step of hot-melt adhesion may be performed by conducting heat using heated rollers or similar mechanisms. It may likewise be performed with convection of heat using an electrical oven, a gas-burning oven, a hot-air oven or related devices. Hot-melt adhesion may also be performed using the heat of resistance of the metallic substrate. Conventional inductive, induced or guided heating may also be used to facilitate hot-melt adhesion.

The temperature for hot-melt adhesion is based upon the melting point (mp) of each involved resin. Preferably, this temperature ranges from about 100° C. below mp to about 50° C. above mp.

Described hereinafter is one method of manufacturing containers using the laminated sheets of the present invention.

The method includes cutting the laminated sheet metal into small disk-shaped pieces. The disk shaped pieces are then stretched using dies and a puncher to form shallow cups having wide mouths. The resulting shallow cups are then re-stretched to form deep cups with narrow mouths. Enhanced corrosion resistance is obtained with the present invention, even when the laminated sheet metal is deformed by stretching.

Enhanced corrosion resistance was demonstrated although the laminated sheet metal of the present invention was subjected to a stretch ratio ranging from about 2.0 to about 4.0. Similarly, satisfactory corrosion resistance was obtained even when the laminated sheet metal was re-stretched with bending and stretching.

This step, according to the process of the present invention, produces thin walled cans having side walls which are about 70 to about 100 percent of the thickness of bottom wall.

The laminated sheet metal according to the present invention is processed to form can covers by punching and pressing. The laminated sheet metal is further processed to form an easy-open can cover. This involves the step of scoring, button formation, and tab disposition after punching and pressing.

The present invention is described by the Examples which follow. These examples describe resin synthesis for use in conjunction with the laminated metal sheet of the present invention. The methods used for measurement and evaluation are described in detail below, prior to Examples 1–7 and Comparisons 1–7.

BESO/SOLVESO 100 (a hydrocarbon solvent obtained from EXXON) are added in predetermined amounts as listed in TABLE 1.

TABLE 1

|  | Modified Epoxy Resin | | | | | | | |
|---|---|---|---|---|---|---|---|---|
|  | A | B | C | D | E | F | G | H |
| Amount Used (g) | | | | | | | | |
| Epicoat 828 | 638 | 630 | 624 | 644 | 598 | 640 | 623 | 544 |
| Bisphenol A | 332 | 340 | 340 | 346 | 327 | 330 | 373 | 156 |
| Polyamidodicarboxylic Acid Solution | 60 | 60 | 60 | 20 | 150 | 60 | 0 | 300 |
| Solveso 100 | 80 | 80 | 80 | 100 | 35 | 80 | 110 | 80 |
| Reaction Conditions | | | | | | | | |
| Reaction Temperature (°C.) | 160 | 160 | 160 | 160 | 160 | 160 | 160 | 160 |
| Reaction Time (Hour) | 3 | 4 | 7 | 2 | 3 | 2 | 10 | 4 |
| Characteristics of Resin | | | | | | | | |
| Content of Polyamido-dicarboxylic Acid (%) | 3 | 3 | 3 | 1 | 7.5 | 3 | 0 | 15 |
| Epoxy Equivalent (g/eq) | 3000 | 4000 | 5000 | 3200 | 2990 | 1400 | 33000 | 4200 |
| Weight Averaged Molecular Weight | 25000 | 40500 | 65000 | 23000 | 31000 | 15400 | 118000 | 50000 |

EXAMPLES

1. Synthesis of Polyamidodicarboxylic Acid 947 g of HARIDAIMA/HARIDIMER 300 (a dimeric acid obtained from Harima Kasei Kogyo Sha) and 53 g of ethylene diamine were added to a reactor equipped with an agitator, a thermometer, a cooler and supplied with nitrogen gas.

The above components were maintained at 60° C. for 30 minutes under flowing nitrogen in order to facilitate a reaction between the above components. The temperature of the reactor was then raised to 120° C. in 1 hour. The reactor was maintained at 120° C. for 2 hours and cooled down to room temperature to produce 968 g of polyamidodicarboxylic acid with an amine value of 1 and an acid value of 91.

The resulting polyamidodicarboxylic acid was diluted with SORUBBESO/SOLVESO 100 (a hydrocarbon solvent obtained from EXXON) to provide a 50% polyamidodicarboxylic acid solution containing 50% solid components.

To a reactor equipped with an agitator, a thermometer, a cooler and a nitrogen gas supply, EPIKOTO/EPICOAT 828 (a liquid epoxy resin obtained from Yuka Shell KK), bisphenol A, polyamidodicarboxylic acid solution, and SORUB- 2. Preparation of High Molecular Weight Modified Epoxy Resin After adding 0.5 g of ethyl triphenyl phosphonium phosphate, reactions under conditions specified in TABLE 1 were conducted. Flowing nitrogen was used to give high molecular weight, modified epoxy resins A to H. The characteristics of these high molecular weight, modified epoxy resins (including the weight averaged molecular weight, the epoxy equivalent, the acid value, and the amine value) are summarized in TABLE 1.

3. Weight Averaged Molecular Weight

High molecular weight epoxy resin and high molecular weight modified epoxy resin samples were dissolved in tetrahydrofuran (THF) to form solutions containing 0.3 weight percent of resin. The solution were analyzed by GPC using HLC 8020 (a GPC measurement equipment obtained from Toyo Soda Kogyo) with an RI detector and a TSK gel G4000HXL/G3000HXL/G 2000HXL/G1000HXL column at 40° C.

THF was used as the solvent at 1 ml/min. About 20 microliters of the resin solution were analyzed to give a GPC chart. The weight averaged molecular weight was determined based on a standard polystyrene reference.

4. Epoxy Equivalent

About 4 g of epoxy resin sample was placed in a 100-ml beaker and dissolved in about 50 ml of methylene chloride. After adding 10 ml of tetraethyl ammonium bromide/acetic acid solution and 2 to 3 drops of crystal violet indicator, the solution was titrated by 0.1 N perchloric acid/acetic acid solution. The end point of the titration was determined by the color change of the indicator. With a blank test run in the same way, the epoxy equivalent was calculated from the following formula:

$$\text{Epoxy equivalent} = \frac{100 \times W \times \alpha}{(V-B) \times N \times F}$$

where,

W: Weight of sample (g)

α: Weight fraction of resin

V: Volume of 0.1 N perchloric acid/acetic acid solution used in titration (ml)

B: Volume of 0.1 N perchloric acid/acetic acid solution used in blank test (ml)

N: Normality of 0.1 N perchloric acid/acetic acid solution (eq/l)

F: Factor of 0.1 N perchloric acid/acetic acid solution

5. Acid Value

A polyamidodicarboxylic acid sample was dissolved in a mixed solvent (tetrahydrofuran (THF)/methylene chloride= 1/5), and titrated with 0.1 N ethanolic KOH solution using phenolphthalein as indicator. The acid value was given by the formula below:

$$\text{Acid value} = \frac{56.11 \times 0.1 \times A}{W}$$

where,

A: Volume of 0.1 N ethanolic KOH solution used in titration (ml)

W: Weight of polyamidodicarboxylic acid sample (g)

6. Amine Value

A polyamidodicarboxylic acid sample was dissolved in tetrahydrofuran (THF) and titrated with 0.02 N aqueous HCl solution using bromophenol blue as indicator. The amine value was given by the formula below:

$$\text{Amine value} = \frac{56.11 \times 0.02 \times A}{W}$$

where,

A: Volume of 0.02 N aqueous HCl solution used in titration (ml)

W: Weight of polyamidodicarboxylic acid sample (g)

7. Preparation of Phenol Formaldehyde Resin

One (1.0) mole of bisphenol A and 2.4 moles of formaldehyde from a 37 percent aqueous solution are added to a reactor. The resulting combination is heated to 50° C. with agitation to form a solution. After adding 0.1 mole of magnesium hydroxide, the temperature is raised to 90° C. and kept constant for one hour.

Subsequently, a mixed solvent consisting of 30 parts by weight of methyl ethyl ketone, 20 pans by weight of cyclehexanone, and 50 parts by weight of xylene was added to extract the products of the condensation reaction.

After washing twice with deionized water and removing the aqueous layer, the residual water in the oil layer was removed by azeotropic distillation. After cooling, a 30 percent solution of phenol aldehyde resin was obtained.

8. Primer

The 30 percent solution of phenol aldehyde resin (resol type) was mixed with the high molecular weight, modified epoxy resins A to H obtained from EXAMPLE 1 and curing catalyst according the predetermined ratio shown in TABLE 2. A mixed solvent (cyclehexanone: MIBK: MEK=1:1:1) was added to give a primer containing 20 weight percent of coating resin components.

TABLE 2

| Sample Number | | Primer Resin Composition (Weight %) | | | | Can Body Adherence (%) | Cola Storage Test 37° × 1 Year | |
|---|---|---|---|---|---|---|---|---|
| | | Modified Epoxy Resin | Phenol Resin Curing Agent | Curing Catalyst | Formation of Laminated Sheet Metal Body | | Concentration of iron Dissolved in Cola (ppm) | Corrosion at inside Surface of Can |
| Example | 1 | Resin A 48 | 48 | 4 | Good | 0 | 0.86 | No Corrosion Observed |
| Example | 2 | Resin B 74 | 24 | 2 | Good | 0 | 0.12 | No Corrosion Observed |
| Example | 3 | Resin B 90 | 9.5 | 0.5 | Good | 0 | 0.08 | No Corrosion Observed |
| Example | 4 | Resin C 95 | 4.8 | 0.2 | Good | 0 | 0.30 | No Corrosion Observed |
| Example | 5 | Resin D 80 | 19 | 1 | Good | 0 | 0.15 | No Corrosion Observed |
| Example | 6 | Resin E 90 | 9.5 | 0.5 | Good | 0 | 0.45 | No Corrosion Observed |
| Example | 7 | Resin B 74 | 24 | 2 | Good | 0 | 0.08 | No Corrosion Observed |
| Comparison | 1 | Resin B 30 | 70 | 0 | Film Peels Off Due to Aggregation of Primer | 65 | — | Corrosion in upper portion of can. Holes formed. No. of leaking can found: 62/100 |
| Comparison | 2 | Resin B 97 | 3 | 0 | Film Peels Off Due to Aggregation of Primer | 84 | — | Corrosion in upper portion of can. Holes formed. No. of leaking can found: 62/100 |
| Comparison | 3 | Resin B 65 | 20 | 15 | Film Peels Off at Boundary between Metal and Primer | 100 | — | Corrosion in upper portion of can. Holes formed. No. of leaking can |

TABLE 2-continued

| | | Primer Resin Composition (Weight %) | | | | Cola Storage Test 37° × 1 Year | | |
|---|---|---|---|---|---|---|---|---|
| Sample Number | | Modified Epoxy Resin | Phenol Resin Curing Agent | Curing Catalyst | Formation of Laminated Sheet Metal Body | Can Body Adherence (%) | Concentration of iron Dissolved in Cola (ppm) | Corrosion at inside Surface of Can |
| Comparison | 4 | Resin F 80 | 19 | 1 | Film Peels Off Due to Aggregation of Primer | 83 | — | found: 62/100 Corrosion in upper portion of can. Holes formed. No. of leaking can found: 62/100 |
| Comparison | 5 | Resin G 74 | 24 | 2 | Film Peels Off at Boundary between Metal and Primer | 100 | — | Corrosion in upper portion of can. Holes formed. No. of leaking can found: 62/100 |
| Comparison | 6 | Resin H 74 | 24 | 2 | Good | 0 | 4.66 | Under-film corrosion found under primer layer inside the can |
| Comparison | 7 | — | — | — | Good | 6 | 9.72 | Under-film corrosion found under polyester film inside the can |

However, in EXAMPLE 7, a primer with a predetermined composition shown in TABLE 2 was prepared with an additional, preliminary condensation reaction at 100° C. for 2 hours.

9. Can Body Adherence Test

The adherence of the primer coating film was evaluated by a can body adherence test using a cross cut adhesion test. A cutting means was centered at a position 30 mm away from the front the flange edge of an empty can. Then the primer coating film inside the empty can was crosscut to form 100 subdivided square areas. Each square area was 1 mm by 1 mm.

Subsequently, SCOTCH 610 (TM) (an adhesive tape obtained from 3M) was applied to these crosscut areas and peeled off. The percentage of the crosscut areas losing their coated film was used to evaluate the can body adhesion of the coating material.

10. Cola Storage Test 100 cans filled with cola were used per test. The cans were kept at room temperature for one week. Subsequently, a steel bar with a diameter of 10 mm was placed on the bottom of each can and impacted by a weight of 500 g falling from a height of 60 mm. Following these steps, the cans were stored at 37° C. for one year. After one year, the average amount of iron leached out by the cola was measured with 5 cans by atomic absorption (AA) and the inside of each can was observed.

EXAMPLE 1

Laminated Sheet Metal

A two directionally oriented polyester film, about 25 μm thick of terephthalic acid (PET)—isophthalic acid (I) copolymer (PET:I=88:12) was coated by the primer solution set forth in TABLE 2. The film was then dried at 100° C. forming a primer-coated film with about 0.6 g/m² of dried primer.

The primer-coated side of the resulting film was then thermally laminated onto both sides of a tin-free steel (TFS) sheet. The tin-free steel (TFS) sheet was about 0.165 mm thick, and made up of DR-9 tin-free steel (TFS). The resulting film was laminated onto both sides of the sheet at the melting point of the polyester film. This was cooled immediately by water producing a laminated sheet metal.

The laminated sheet metal was coated by petrolatum and punched to form a disk having a diameter of about 179 mm. Using a conventional method, the disk was drawn at about 80° C. with a drawing ratio of 1.56 to form a shallow cup.

The shallow cup which obtained was preheated at 80° C. and re-drawn twice to form a deep cup having thin walls. The drawing ratio of the first redrawing was 1.37 while the drawing ratio of the second re-drawing was 1.27. The deep cup having thin walls was about 128 mm tall and about 66 mm wide. The deep cup which was obtained was 20 percent thinner than the thickness of the original bare metal sheet.

After doming at 80° C. by a conventional method, the deep cup was heat-treated at 220° C. and left to cool at room temperature. After trimming the edge of the open end, priming on a curved surface, and processing the flange—a two-piece can was obtained. The two-piece can which was obtained weighed about 350 g.

One hundred such resulting cans were filled with cola. The cans underwent a storage test, in which they were maintained at 37° C. for one year. After one year, the average amount of iron leached out by the cola was measured. Similarly, the inside conditions and the leakage of the cans were observed. As shown in TABLE 2, no particularly abnormal conditions were observed.

EXAMPLE 2

Laminated Sheet Metal

A laminated metal sheet was obtained through the processes described at length above (in EXAMPLE 1). The laminated metal sheet had a primer composition as shown in TABLE 2. As can be seen in TABLE 2, no particularly abnormal conditions were observed following the 1 year cola storage test.

EXAMPLE 3

Laminated Sheet Metal

A laminated metal sheet was obtained through the processes described at length above (in EXAMPLE 1). The laminated metal sheet has a primer composition as shown in TABLE 2. As can be seen in TABLE 2, no particularly abnormal conditions were observed following the 1 year storage test.

EXAMPLE 4

Laminated Sheet Metal

A primer with the composition shown in TABLE 2 was applied onto the inside surface of a tin-free steel sheet to form a 2 μm thick, dry film. Right after baking at about 225° C. for about 5 seconds, both sides of the tin-free steel sheet were thermally laminated. The two sides of the tin-free sheet were thermally laminated by a 25 μm thick, two directionally oriented polyester film of terephthalic acid (PET)—isophthalic acid (I) copolymer (PET:I=88:12).

Subsequently, a laminated sheet metal was obtained as fully described in EXAMPLES 1–3. As can be seen in TABLE 2, no particularly abnormal conditions were observed after the storage test.

EXAMPLE 5

Laminated Sheet Metal

A laminated metal sheet is obtained through the processes described at length above (in EXAMPLE 1) having a primer composition as shown in TABLE 2, and a two directionally oriented polyester film of terephthalic acid (PET)—isophthalic acid (I)—polybutylene terephthalate (PBT) copolymer (PET:I:PBT—66:9:25).

As can be seen in TABLE 2, no particularly abnormal conditions were observed after the storage test.

EXAMPLE 6

Laminated Sheet Metal

A laminated metal sheet was obtained through the processes described at length above (in EXAMPLE 1). The laminated metal sheet had a primer composition as shown in TABLE 2. As can be seen in TABLE 2, no particularly abnormal condition were observed after the storage test.

EXAMPLE 7

Laminated Sheet Metal

A primer with a composition as shown in TABLE 2 was prepared with an additional, preliminary condensation reaction at 100° C. for 2 hours. Subsequently, a laminated sheet metal was obtained as per the processes described in EXAMPLE 3. As can be seen in TABLE 2, no particularly abnormal condition were observed after the storage test.

COMPARISON 1

Laminated Sheet Metal

With a predetermined primer composition, as shown in TABLE 2, a laminated sheet metal was obtained by the processes and procedures detailed at length in EXAMPLE 1 (above). As can be seen from TABLE 2, during the formation of the laminated sheet metal, the primer-coated film was peeled off due to the aggregation of primer material. Furthermore, remarkable corrosion at the upper portion of the can is observed after the cola storage test. Among the 100 cans tested, 62 cans leaked after the storage test. The amount of dissolved iron inside the can was not measured.

COMPARISON 2

Laminated Sheet Metal

With a primer composition as shown in TABLE 2, a laminated sheet metal was obtained according to the steps described at length in EXAMPLES 1–3. As evident from TABLE 2, during the formation of the laminated sheet metal the primer-coated film was peeled off due to aggregation of the primer material. Furthermore, remarkable corrosion at the upper portion of the cans was observed following the cola storage test. Among the 100 cans tested 75 cans leak after the storage test. As above, the amount of the dissolved iron inside the can required no measurement.

COMPARISON 3

Laminated Sheet Metal

With a primer composition as shown in TABLE 2, a laminated sheet metal was obtained according to the steps described at length in EXAMPLES 1–3. As evident from TABLE 2, during the formation of the laminated sheet metal the primer-coated film was peeled off due to aggregation of the primer material. Furthermore, remarkable corrosion at the upper portion of the cans was observed following the cola storage test. Among the 100 cans tested 99 cans leaked after the storage test. The amount of the dissolved iron inside the can was not measured for the reasons set forth above.

COMPARISON 4

Laminated Sheet Metal

With a primer composition as shown in TABLE 2, a laminated sheet metal was obtained according to the steps described at length in EXAMPLES 1–3. As evident from TABLE 2, during the formation of the laminated sheet metal the primer-coated film was peeled off due to aggregation of the primer material. Furthermore, remarkable corrosion at the upper portion of the cans was observed following the cola storage test. Among the 100 cans tested, 68 cans leak after the storage test. Likewise, in this case, the amount of dissolved iron inside the can was not measured.

COMPARISON 5

Laminated Sheet Metal

With a primer composition as shown in TABLE 2, a laminated sheet metal was obtained according to the steps described at length in EXAMPLES 1–3. As evident from TABLE 2, during the formation of the laminated sheet metal the primer-coated film was peeled off due to aggregation of the primer material. Furthermore, remarkable corrosion at the upper portion of the cans was observed following the cola storage test. Among the 100 cans tested 99 cans leak after the storage test. The amount of dissolved iron inside the can was not measured for the reasons set forth above.

COMPARISON 6

Laminated Sheet Metal

With a primer composition shown in TABLE 2, a laminated sheet metal was obtained following the above described processes, as set forth in EXAMPLE 3. As can be seen from TABLE 2, good laminate formation and can body adherence were observed during the formation of the laminated sheet metal.

However, remarkable corrosion on the inside film and the under-film corrosion were observed after the cola storage test. Since a significant amount of dissolved iron inside the can was detected (4.66 ppm), it was determined that these cans are not suitable for use as containers for cola or related substances.

COMPARISON 7

Laminated Sheet Metal

Without primer, both sides of a tin-free steel sheet were thermally laminated with a 25 micron thick, two directionally oriented polyester film of terephthalic acid (PET)— isophthalic acid (I)copolymer (PET:I=88:12). Subsequently, a laminated sheet metal was obtained following the processes described at length in EXAMPLE 3. As can be seen in TABLE 2, good laminate formation and can body adherence were observed during the formation of the laminated sheet metal.

However, remarkable corrosion under the inside film was observed after the cola storage test. Since a significant amount of dissolved iron inside the can was detected (9.72 ppm), these cans were likewise determined to be not suitable for use as containers for cola or related substances.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A laminated sheet metal, comprising:

a sheet metal;

a thermoplastic resin film;

a primer resin layer between said sheet metal and said thermoplastic resin film;

said primer resin layer being of a primer resin composition; and, said primer resin composition containing, in weight percent, from about 50 to about 98 of a polyamidodicarboxylic acid modified epoxy resin; from about 2 to about 50 of a curing agent resin, and from about 0.05 to about 10 of a curing catalyst.

2. The laminated sheet metal according to claim 1, wherein:

said polyamidodicarboxylic acid modified epoxy resin has a molecular weight of from about 20,000 to about 100,000.

3. The laminated sheet metal according to claim 1, wherein:

said polyamidodicarboxylic acid modified epoxy resin has an epoxy equivalent of from about 2,500 to about 8,000.

4. The laminated sheet metal according to claim 3, wherein:

said polyamidodicarboxylic acid modified epoxy resin includes an epoxy skeleton of bisphenol A type.

5. The laminated sheet metal according to claim 3, wherein:

said polyamidodicarboxylic acid modified epoxy resin includes an epoxy skeleton of one divalent phenol selected from the group consisting of bisphenol B and bisphenol F.

6. The laminated sheet metal according to claim 1, wherein:

said thermoplastic resin film includes at least one film selected from the group consisting of a polyolefin resin film, a polyester resin film, a polyamide film, a polyvinyl chloride film, and a polyvinyliene chloride film.

7. The laminated sheet metal according to claim 6, wherein:

said polyolefin resin film includes at least one selected from the group consisting of polyethylene, polypropylene, ethylene-propylene copolymer, ethylene-vinyl acetate copolymer, and ethylene-acrylate copolymer.

8. The laminated sheet metal according to claim 6, wherein:

said polyester film includes at least one selected from the group consisting of polyethylene terephthalate, polyethylene adipate, polybutylene terephthalate, ethylene-terephthalate/isophthalate copolymer, ethylene terephthalate/adipate copolymer, blended copolymer, and ionomer.

9. The laminated sheet metal according to claim 6, wherein:

said polyamide film includes at least one member selected from the group consisting of nylon 6, nylon 6,6, nylon 11, and nylon 12.

10. The laminated sheet metal according to claim 6, wherein:

a thickness of said thermoplastic film ranges from about 5 to about 50 µm.

11. The laminated sheet metal according to claim 1, wherein:

a thickness of said thermoplastic resin film ranges from about 3 to about 100 µm.

12. The laminated sheet metal according to claim 1, wherein content of said curing catalyst ranges from 0.1 to 5 weight percent.

13. The laminated sheet metal according to claim 1, wherein said curing catalyst is selected from the group consisting of phosphoric acid and toluene sulfonic acid.

14. A laminated sheet metal comprising:

a sheet metal;

a thermoplastic resin film;

a primer resin layer between said sheet metal and said thermoplastic resin film;

said primer resin layer being a primer resin composition; and said primer resin composition containing, in weight percent, from about 50 to about 98 of a polyamidodicarboxylic acid modified epoxy resin; from about 2 to about 50 weight percent of a curing agent resin; from about 0.05 to about 10 weight percent of a curing catalyst;

said polyamidodicarboxylic acid modified epoxy resin includes an epoxy skeleton of bisphenol A type, wherein the concentration of said polyamidodicarboxylic acid modified epoxy resin per said epoxy skeleton is from about 1 to about 10 weight percent.

15. The laminated sheet metal according to claim 14, wherein:

said polyamidodicarboxylic acid modified epoxy resin has a molecular weight of from about 20,000 to about 100,000.

16. The laminated sheet metal according to claim 14, wherein:

said polyamidodicarboxylic acid modified epoxy resin has an epoxy equivalent of from about 2,500 to about 8,000.

17. The laminated sheet metal according to claim 16, wherein:

said polyamide film includes at least one member selected from the group consisting of nylon 6, nylon 6,6, nylon 11, and nylon 12.

18. The laminated sheet metal according to claim 16, wherein:

said polyamidodicarboxylic acid modified epoxy resin includes an epoxy skeleton of one divalent phenol selected from the group consisting of bisphenol B and bisphenol F.

19. The laminated sheet metal according to claim 14, wherein:

said thermoplastic resin film includes at least one film selected from the group consisting of a polyolefin resin film, a polyester resin film, a polyamide film, a polyvinyl chloride film, and a polyvinyliene chloride film.

20. The laminated sheet metal according to claim 19, wherein:

said polyolefin resin film includes at least one selected from the group consisting of polyethylene, polypropylene, ethylene-propylene copolymer, ethylene-vinyl acetate copolymer, and ethylene-acrylate copolymer.

21. The laminated sheet metal according to claim 19, wherein:

said polyester film includes at least one selected from the group consisting of polyethylene terephthalate, polyethylene adipate, polybutylene terephthalate, ethylene-terephthalate/isophthalate copolymer, ethylene terephthalate/adipate copolymer, blended copolymer, and ionomer.

22. The laminated sheet metal according to claim 19, wherein:

a thickness of said thermoplastic film ranges from about 5 to about 50 μm.

23. The laminated sheet metal according to claim 14, wherein:

a thickness of said thermoplastic resin film ranges from about 3 to about 100 μm.

24. The laminated sheet metal according to claim 14, wherein content of said curing catalyst ranges from 0.1 to 5 weight percent.

25. The laminated sheet metal according to claim 14, wherein said curing catalyst is selected from the group consisting of phosphoric acid and toluene sulfonic acid.

* * * * *